(12) United States Patent
Lee et al.

(10) Patent No.: US 6,999,653 B2
(45) Date of Patent: Feb. 14, 2006

(54) 4-PORT WAVELENGTH SELECTIVE ROUTER

(75) Inventors: Chang Hee Lee, Taejon (KR); Hyun Deok Kim, Taegu (KR); Tae Won Oh, Taegu (KR); Shin Jeong Hun, Taegu (KR); Cho Yun Hee, Seoul (KR)

(73) Assignee: Korea Advanced Institute of Science & Technology, Taejon (KR)

( * ) Notice: Subject to any disclaimer, the term of this patent is extended or adjusted under 35 U.S.C. 154(b) by 0 days.

(21) Appl. No.: 09/912,358

(22) Filed: Jul. 26, 2001

(65) Prior Publication Data

US 2002/0028039 A1 Mar. 7, 2002

(30) Foreign Application Priority Data

Aug. 12, 2000 (KR) ........................................ 2000-46825

(51) Int. Cl.
*G02B 6/28* (2006.01)

(52) U.S. Cl. .............................. 385/24; 385/15; 385/31
(58) Field of Classification Search ............. 385/15–24, 385/31
See application file for complete search history.

(56) References Cited

U.S. PATENT DOCUMENTS

| 5,706,375 A | * | 1/1998 | Mihailov et al. ............. 385/24 |
| 5,875,272 A | * | 2/1999 | Kewitsch et al. ............. 385/37 |
| 6,061,484 A | * | 5/2000 | Jones et al. ................... 385/24 |
| 6,567,194 B1 | * | 5/2003 | Badr ............................. 398/1 |

FOREIGN PATENT DOCUMENTS

| GB | 2358305 A | * | 7/2001 |
| JP | 07212316 A | * | 8/1995 |

* cited by examiner

Primary Examiner—Akm Enayet Ullah
Assistant Examiner—Michelle R. Connelly-Cushwa
(74) Attorney, Agent, or Firm—Bacon & Thomas, PLLC

(57) ABSTRACT

The present invention relates to a 4-port wavelength selective router and the add/drop multiplexer using the above router. More particularly, it relates to a 4-port wavelength selective router that can effectively routes counter-propagating signals while suppressing multiple reflections generated in the bidirectional transmission systems and networks.

11 Claims, 20 Drawing Sheets

4-PORT WAVELENGTH SELECTIVE ROUTER

BACKGROUND OF THE INVENTION

1. Field of the Invention

The present invention relates to a 4-port wavelength selective router that routes the counter-propagating signals while suppressing relative intensity noise induced by the multiple back reflections in the bidirectional transmission systems and networks.

2. Description of the Related Art

The bidirectional signal transmission over a single fiber is advantageous compared with the unidirectional signal transmission. It enables full-duplex communications between two nodes with a single strand of optical fiber. It also alleviates the nonlinear effects of optical fiber and thereby enables to achieve higher spectral efficiency.

However, the bidirectional transmission systems suffer from the optical back reflections. In bidirectional transmission systems, the counter-propagating signals are usually allocated at different wavelengths. Thus, we can suppress the reflected light by using optical filters at the receiver. However, we cannot remove the multiple reflected lights in such a way and the multiple reflected lights causes a relative intensity noise. The magnitude of the relative intensity noise is proportional to the square of optical amplifier gain. Thus the relative intensity noise limits the maximum available amplifier gains of the bidirectional transmission systems and networks.

FIG. 1 shows a schematic diagram of a conventional wavelength-division multiplexing (WDM) bidirectional transmission system. It also illustrates a relative intensity noise generation path in the bidirectional transmission system. Each node comprises a transmitter (TX) that generates the WDM signal to be transmitted to the other node and a receiver (RX) that receiving the WDM signals transmitted from said the other node. Also an optical circulator (Cir) will be installed at each node to route the receiving and the transmitting signals. Several bidirectional optical amplifiers (BA) are installed in the bidirectional transmission link deployed between two nodes to compensate for the loss of optical fibers (10).

In this WDM bidirectional transmission system, the output wavelengths of the two nodes are different. We can allocate the wavelengths of the counter-propagating signals according to two different methods: band split scheme and wavelength-interleaved scheme. In the band split bidirectional transmission system as shown in FIG. 2, the wavelengths of WDM signals being transmitted in the same direction are contiguous, while the wavelengths of counter-propagating signals are allocated in different wavelength bands. In the wavelength-interleaved bidirectional transmission systems as shown in FIG. 3, the counter-propagating signals are interlaid in wavelength domain.

By allocating the different wavelengths for the optical signals propagating in the opposite directions, we can eliminate the reflected noisy light generated by the simple reflection. In other words, even if the signal propagating in one direction is reflected at the optical fibers (10) or other optical components and then combines with the other direction signal, the reflected light will be eliminated at the receiver (RX) by an optical filter. However, the optical filter installed at the receiver (RX) cannot remove the multiple reflected noisy lights because their wavelengths are same as those of the signal lights.

For an example, a signal reflected at an optical fiber (10) would be amplified at the optical amplifier (BA). If this reflected signal were to be reflected again at another optical fiber, it would be amplified again, and combined with the original signal as shown in FIG. 1. In such a case, the wavelength of the multiple-reflected noisy signal is identical to that of the original signal, and thus would not be removed by the optical filter installed at the receiver (RX). Therefore it is necessary a method to suppress the multiple-reflected light in a bidirectional optical transmission system.

In occasion, it is necessary to receive or transmit selected signals at an intermediate node of the bidirectional transmission link. In such a case the bidirectional WDM transmission systems further comprises add/drop multiplexer (ADM) at the intermediate node. FIG. 4 is a schematic diagram of a WDM bidirectional transmission system further comprising a conventional add/drop multiplexer (ADM) that add/drop signals with specific wavelengths.

The conventional add/drop multiplexer (ADM) comprises a de-multiplexer (D), 2×2 optical switches (Sw) and a multiplexer (M).

In this case, two optical circulators (Cir) are used to separate/combine the counter propagating at the input and the output port of the add/drop multiplexer (ADM). The optical signals transmitted from left to right is first routed to the de-multiplexer by the optical circulator (Cir) and then separated as their wavelengths by the de-multiplexer (D). The 2×2 optical switches (Sw) connected to the output ports of the de-multiplexer establish transmission paths for the demultiplexed signals to be dropped or passed though the add/drop multiplexer (ADM). We can add the same wavelength signals with the dropped signals though the optical switch. The outputs of the optical switches are multiplexed by the multiplexer (M) and enter into another optical circulator. The optical circulator route the signals into the optical fiber.

Here, the relative intensity noise can be generated through the transmission path of the signal passing through the ADM as shown in FIG. 4.

Therefore, a means for suppressing the relative intensity noise should be incorporated with the with the ADM.

SUMMARY OF THE INVENTION

The present invention is contrived in order to solve the above problems. It is an object of the present invention to provide a 4-port wavelength selective router that effectively routes the counter-propagating signals over a single optical fiber while suppressing the relative intensity noise induced by the multiple back reflections. The 4-port wavelength selective router in accordance with the present invention has four ports (1, 2, 3, 4) and three internal signal transmission paths between port pairs ((1,2), (2,3), (3,4)). The 4-port wavelength selective router routes two groups (Group A and Group B) of signals propagating counter-directionally. The wavelengths of the signals included in Group A are different from those of the signals included in Group B. When the Group A signals enter at port (2) and output through port (3), and Group B signals enter at port (3) and output through port (2), the signal transmission characteristics of the router is characterized as follows; between port (2) and (3) only the Group A signals can be transmitted from port (2) to port (3), and no signal can be transmitted oppositely; between port (1) and (2), and port (3) and (4) only the Group B signals or both Group A and B signals can be transmitted, but both Group A and B signals are not transmitted simultaneously (in other words, between ports (1) and (2), and ports (3) and (4) at least one port pairs can transmit only the Group B signals); between port (1) and (2), and port (3) and (4) optical signals can be transmitted bidirectionally, but at least one port pair can transmit the signals from port (1) to (2) or from port (3) to (4); and signals inputted to a specific port (1, 2, 3, 4) can be transmitted to only one port (1, 2, 3, 4).

BRIEF DESCRIPTION OF THE DRAWINGS

Exemplary embodiments of the present invention will be described in conjunction with the drawings in which.

EXPLANATIONS FOR MAIN SYMBOLS IN THE DRAWINGS

4pr: 4-port optical path router, 10: optical fiber,
12: thin film, 14: anti reflection (AR) coating,
16a, 16b: dielectric coating,
BA: bidirectional optical amplifier,
BC1,BC2,BC3,BC4: polarization splitter,
Cir,Cir1: optical circulator, D: de-multiplexer,
Fil1,Fil2: optical filter,
FR1, FR2: non-reciprocal rotator, M: multiplexer,
Re: receiving terminal,
RR1,RR2: reciprocal rotator, RX: receiver,
Sw: optical switch, TX: transmitter,
Tr: transmitting terminal,
WF: wavelength selective filter,
WF1,WF2,WF3: wavelength filter,
WSC,WSC1: wavelength selective coupler,
Iso1,Iso2: optical isolator,

DETAILED DESCRIPTION OF THE EMBODIMENTS

The 4-port wavelength selective router (4pr) in accordance with the present invention is used in order to effectively route two groups of counter-propagating signals over a single optical fiber and also to suppress the relative intensity noise induced by multiple back reflections. The above two groups are defined as follows: the first group (Group A) consists of one or more optical signals of different wavelengths. The second group (Group B) consists of one or more optical signals of different wavelengths excluding the signals included in Group A. Here the methods for dividing the optical signals (Group A, Group B) are above mentioned band split scheme or wavelength-interleaved scheme.

Figure 5:
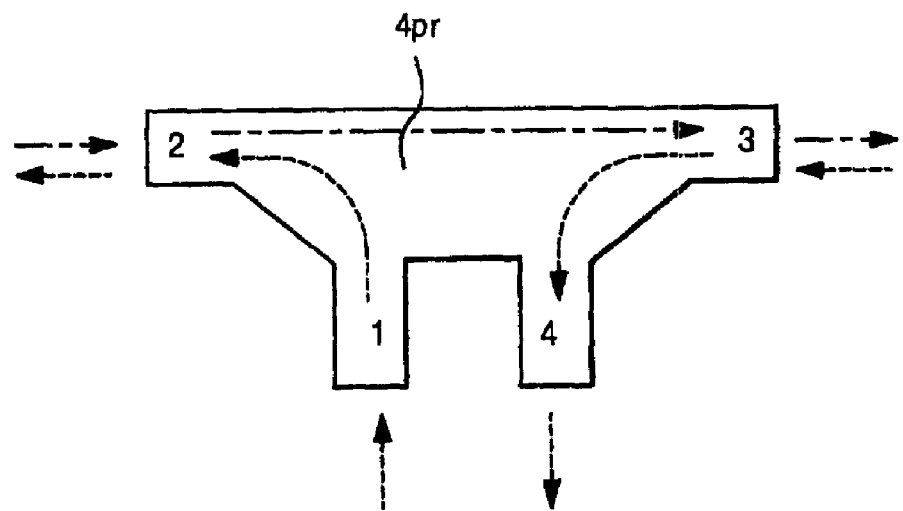
FIG. 5 shows a schematic diagram of the 4-port wavelength selective router according to the present invention.

As shown in FIG. 5, the 4-port wavelength selective router (4pr) has 4 ports (1, 2, 3, 4). Thus the possible combinations of port pairs are 6 in total ((1,2), (2,3), (3,4), (1,3), (2,4), (1,4)). The internal signals transmission paths exist between port pairs (1) and (2), ports (2) and (3), and ports (3) and (4) Whereas there is no signal transmission path between ports (1) and (3), ports (2) and (4), and ports (1) and (4).

At port (2) Group A signals are inputted and Group B signals are outputted. At port (3) Group B signals are inputted and Group A signals are outputted.

The signals transmission characteristics of the ports pairs in the 4-port wavelength selective router (4pr) in accordance with the present invention satisfy the following rules. First, between port (2) and (3), only the Group A signals can be transmitted from port (2) to port (3). No signals can be transmitted in the opposite direction. Second, between ports (1) and (2), and ports (3) and (4) the Group B signals or both Groups A and B signals are transmitted, but both Group A and B signals are not transmitted simultaneously between ports (1) and (2), and ports (3) and (4). In other words, between the two port pairs ((1,2), (3,4)) at least one port pair should transmit only Group B signals. Third, between ports (1) and (2), and ports (3) and (4) optical waves are transmitted bidirectionally but at least one port pair should transmit signals only one direction. Namely, between the two port pairs, at least one port pair should transmit signal from port (1) to (2) or port (3) to (4). Fourth, signals inputted to a specific port (1, 2, 3, 4) cannot be transmitted to more than one port (1, 2, 3, 4) simultaneously.

The number of 4-port wavelength selective router (4pr) modules satisfying the above mentioned rules is eight in total. Table 1 shows the 4-port wavelength selective router (4pr) module types and the optical signal transmission characteristics of the ports pairs. Here X denotes that no optical wave can pass between the two ports.

[Table 1]

The configurable 4-port wavelength selective router (4pr) modules and signal transmission characteristics of them.

Examining module #1 of Table 1, the Group B signal can be transmitted from port (1) to port (2), only the Group A signal from port (2) to port (3), and only the Group B signal from port (3) to port (4). Between all other ports and in the other direction, signals are not transmitted. Continuing to examine module #8 in Table 1, only Group B signal can be transmitted from port (1) to port (2) and only the Group A signal from port (2) to port (3). Between ports (3) and (4), both Groups A and B signals are transmitted bidirectionally. And no optical waves are transmitted in other ports pairs and in the other direction.

Figure 6:
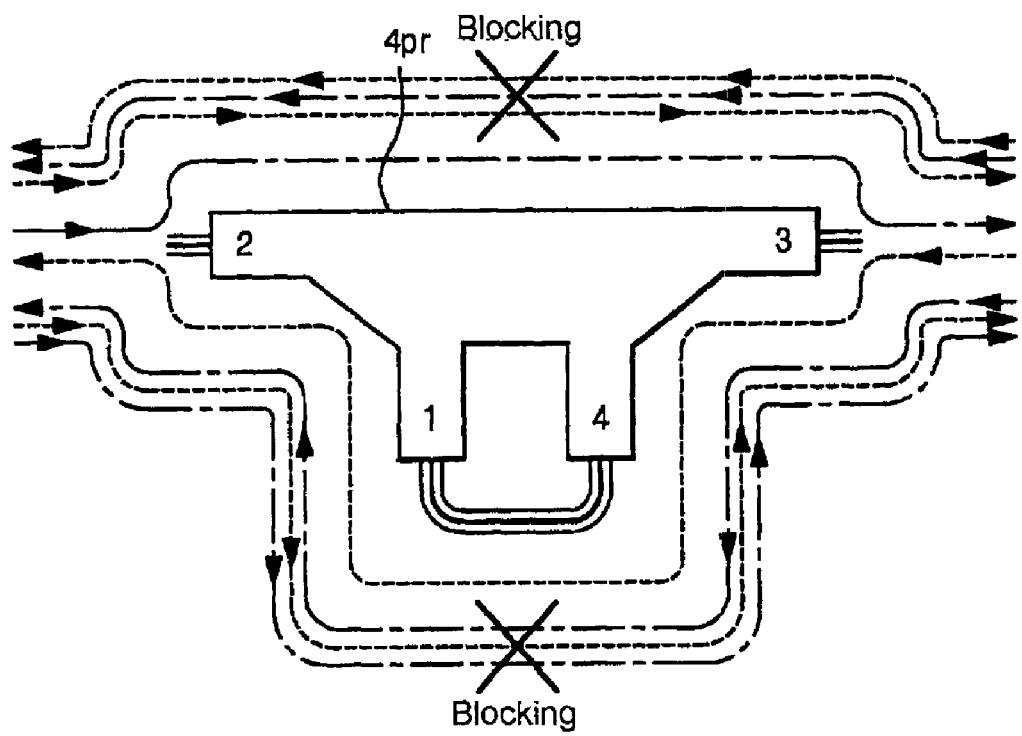
FIG. 6 illustrates the suppression of the multiple reflections with the router in FIG. 5.

As shown in FIG. 6, the 4-port wavelength selective router (4pr) can suppress the multiple reflections generated in the bidirectional transmission systems and networks. When ports (1) and (4) are connected and the counter-propagating signals were inputted/outputted through the ports (2) and (3), the signals being inputted at the port (2) cannot be transmitted from port (3) to port (2) and vice versa. The signals being inputted at the port (3) cannot be transmitted from port (3) to port (1) and vice versa.

Figure 7:
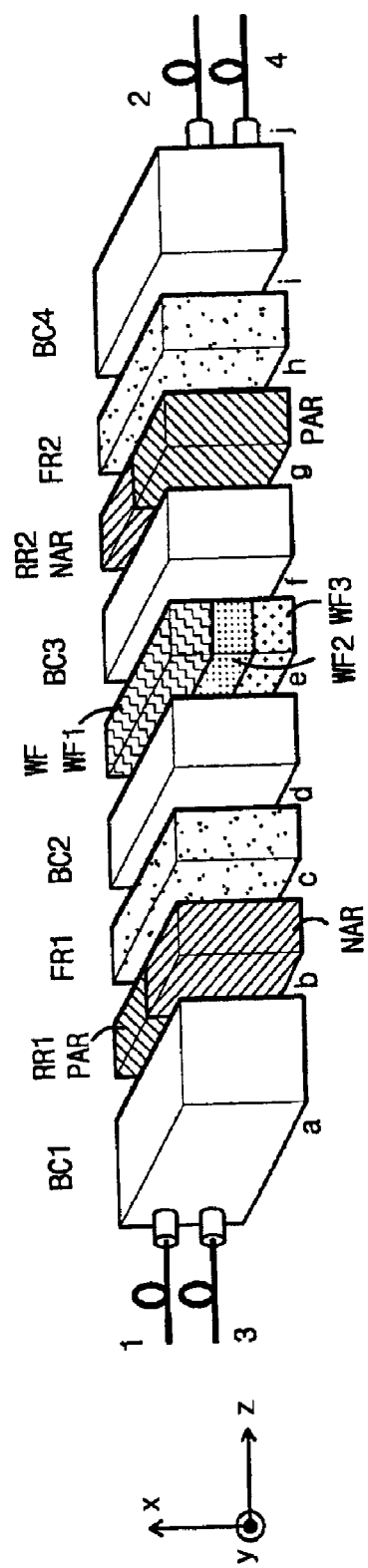
FIG. 7 shows a schematic diagram for the 4-port wavelength selective router according to the first embodiment of the present invention.

FIG. 7 shows the 4-port wavelength selective router (4pr) according to an embodiment of the present invention. The router (4pr) comprises polarization splitters (BC1, BC2, BC3, BC4), reciprocal polarization rotators (RR1, RR2), Faraday non-reciprocal polarization rotators (FR1, FR2), and wavelength selective filter (WF).

The polarization splitters (BC1, BC4) separates an optical wave with an arbitrary polarization, which is inputted through each port (1, 2, 3, 4), into two optical waves that are polarized perpendicular with respect to the z-axis (Parallel to the x or y-axis) The above polarization splitters also combine two optical polarized perpendicularly with respect to the z-axis. The polarization splitters (BC2, BC3) cause a displacement in the x-axis. Namely, extraordinary wave having a polarization in x-axis direction is refracted in x-axis direction at the polarization splitters (BC2, BC3). While ordinary waves having a polarization in y-axis direction pass through the polarization splitters (BC2, BC3) without any refraction.

The reciprocal polarization rotators (RR1, RR2) are composed of two rotators having opposite rotation directions (PAR; Positive Angle Rotator, NAR; Negative Angle Rotator). The two reciprocal polarization rotators (RR1, RR2) have opposite rotation directions. The combination of the reciprocal polarization rotators (RR1, RR2) and the non-reciprocal polarization rotators (FR1, FR2) is a means for the polarization rotation which makes either two orthogonal optical waves have parallel polarization or optical waves polarized in parallel have orthogonal polarizations.

The wavelength selective filter (WF) is a combination of three filters (WF1, WF2, WF3). The uppermost of these filters (WF1) in the x-direction, selects the signals passing from port (1) to (2). The filter located in the middle (WF2) selects the signals passing from ports (2) to (3), and the filter located on the bottom (WF3) will likewise the signals passing from ports (3) to (4).

Figure 8:
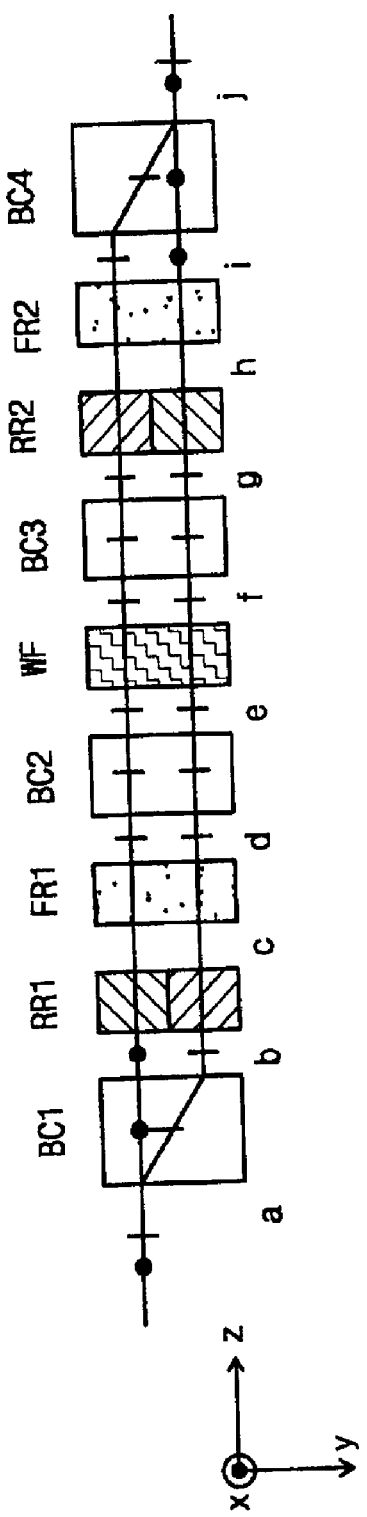
FIG. 8, FIG. 9 and FIG. 10 show the propagation path and the polarization state of the optical wave inputted at the port (1) of the router in FIG. 7.
Figure 9:
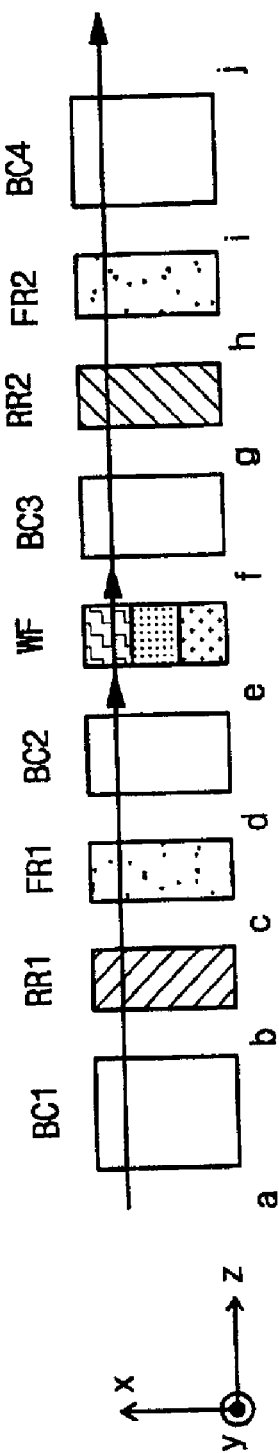
Figure 10:
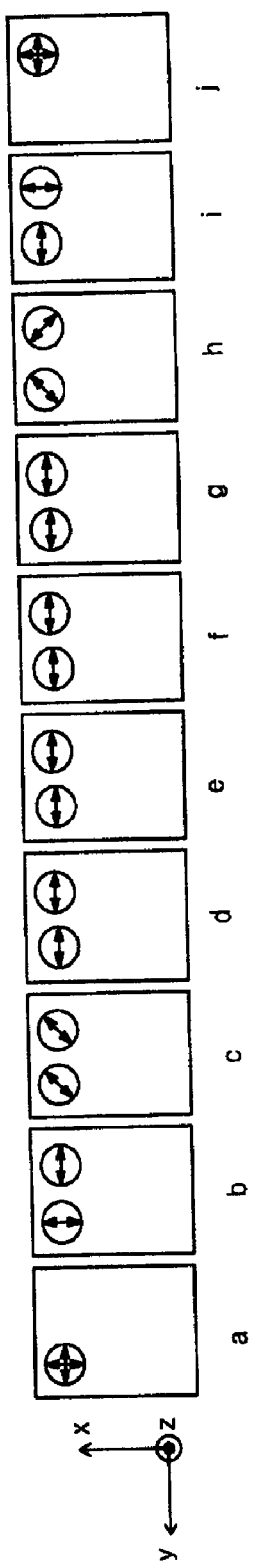

FIG. 8, FIG. 9 and FIG. 10 show the propagation path and the polarization state of the optical wave inputted at port (1) observed in x, y, and z directions, respectively. Here the optical wave with an arbitrary polarization would be separated into ordinary and extraordinary waves on the y-z plane by the polarization splitter (BC1). The two orthogonal optical waves will be rotated +45° and −45°, respectively, by the reciprocal polarization rotator (RR1) and thus they will be polarized in parallel. The above two optical waves will be rotated in the same direction by the non-reciprocal polarization rotator (FR1), so that the polarization becomes parallel to the y-axis, and then pass through the second polarization splitter (BC2) without any displacement in x-direction. Therefore, the optical waves pass through the filter (WF1) located between the two polarization splitters (BC1, BC2). The optical waves then pass through the polarization splitter (BC3) as ordinary waves, and afterwards pass through the reciprocal polarization rotator (RR2) and the non-reciprocal polarization rotator (FR2). Here the polarizations of the two optical waves become orthogonal each other. Thus, the two optical waves are combined at the fourth polarization splitter (BC4) and then transmitted to port (2).

Figure 11:
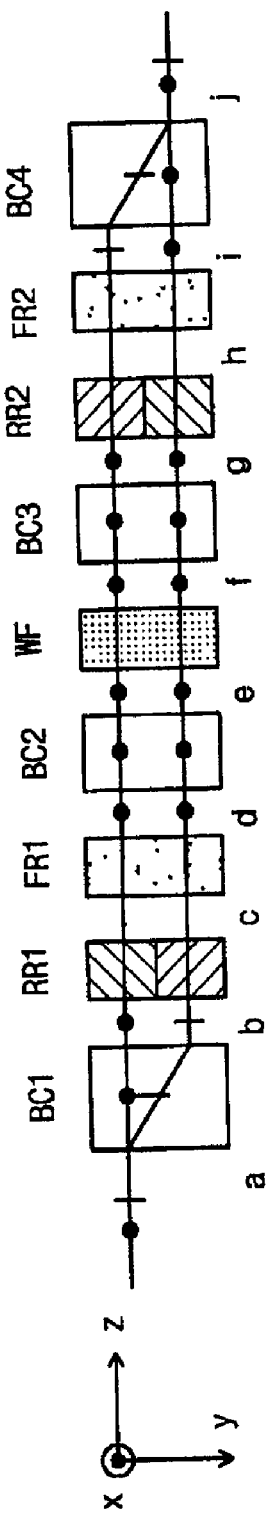
FIG. 11, FIG. 12 and FIG. 13 show the propagation path and the polarization state of the optical wave inputted through port (2) of the router in FIG. 7.
Figure 12:
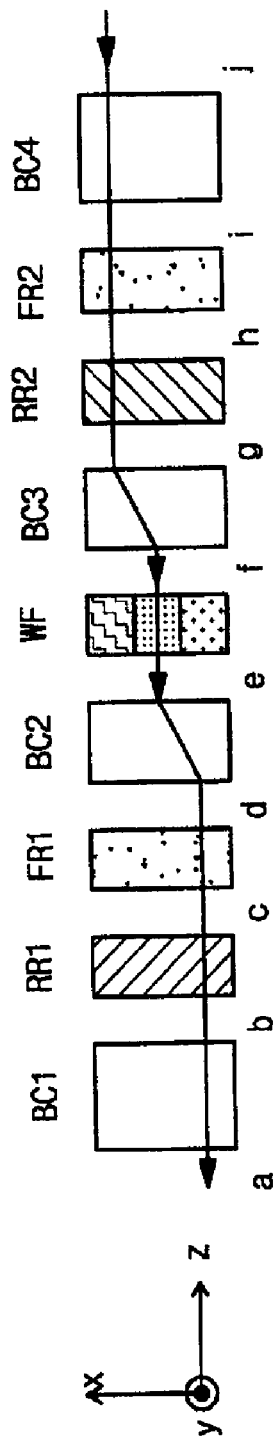
Figure 13:
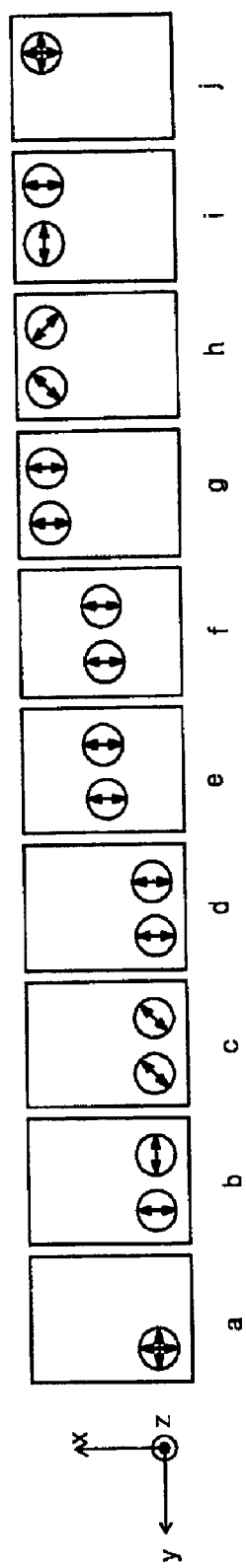

Following the identical principle, FIG. 11, FIG. 12 and FIG. 13 show the propagation path and polarization state of an optical wave inputted at port (2) observed from the x, y, and z direction, respectively. Similarly with the case of the optical wave inputted at port (1), the optical wave is separated into two orthogonal optical waves. They pass through the fourth polarization splitter (BC4), the non-reciprocal polarization rotator (FR2), and the reciprocal polarization rotator (RR2). The polarizations of the optical waves become parallel to the x-axis after passing through the reciprocal polarization rotator (RR2). They pass through the third polarization splitter (BC3) as extraordinary waves and will be refracted into the −x-direction. Therefore they pass the filter (WF2) and will be refracted at the second polarization splitter (BC2) in −x-direction. They will then have orthogonal polarizations each other after passing the non-reciprocal polarization rotator (FR1) and the reciprocal polarization rotator (RR1). Finally the optical waves will be combined at the first polarization splitter (BC1) and be transmitted to port (3).

Figure 14:
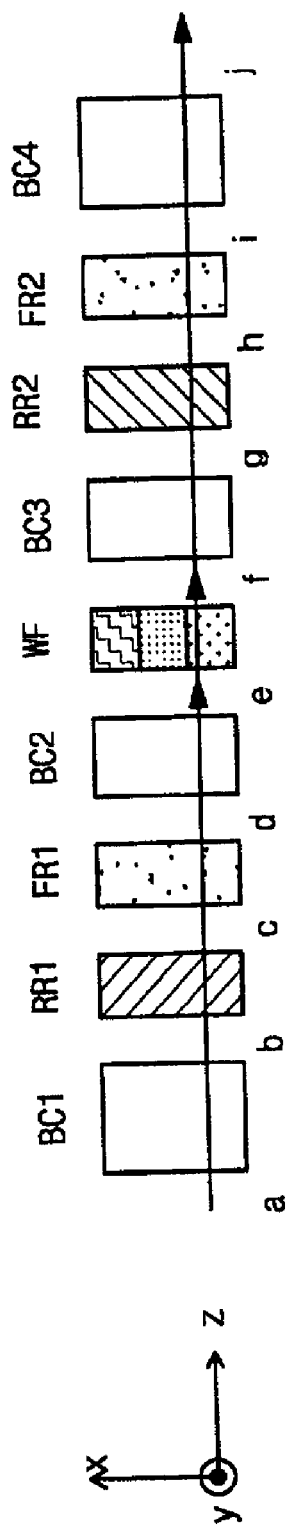
FIG. 14 shows the propagation path of the optical wave inputted at port (3) of the router in FIG. 7.

The optical wave inputted at port (3) propagates with the same polarization state in the y-z plane as the optical wave inputted at port (1). However, as illustrated in FIG. 14, it passes the filter (WF3) and is transmitted to port (4).

Figure 15:
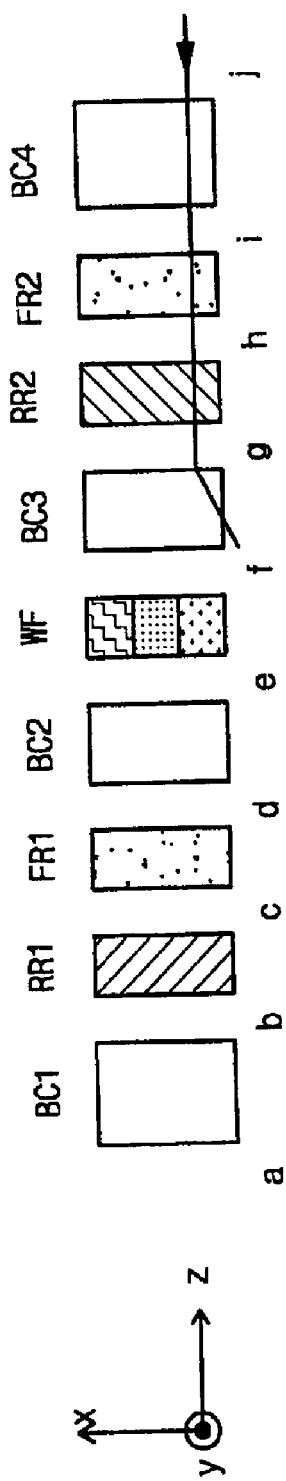
FIG. 15 shows the propagation path of the optical wave inputted at port (4) of the router in FIG. 7.

The optical wave inputted at port (4) propagates with the same polarization state in the y-z plane as the optical wave input at port (2) up to the third polarization splitter (BC3). However, as illustrated in FIG. 15, it is refracted at the third polarization splitter (BC3) in −x-direction and cannot be transmitted to any of the other ports (1, 2, 3).

In the above embodiments, the wavelength selective filter (WF) which is composed of the three filters (WF1, WF2, WF3) has the role of selecting the wavelength of the optical wave which will be transferred between the ports (1, 2, 3, 4). Each of the filters (WF1, WF2, WF3) passes the optical waves with specific wavelengths, but reflects or attenuates the optical waves with other wavelengths.

Figure 16:
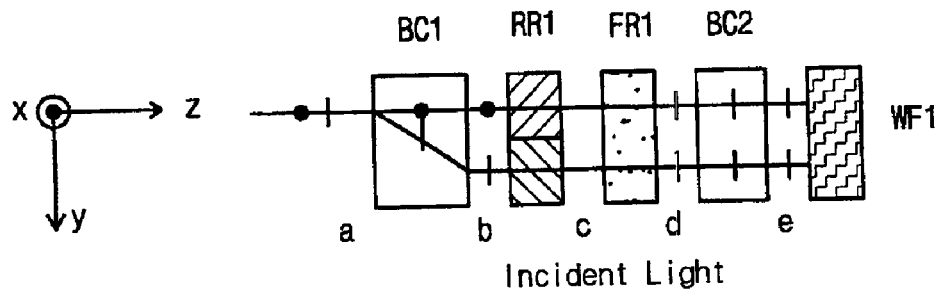
FIG. 16 and FIG. 17 show the propagation path and the polarization state of the optical wave that is reflected at the wavelength selective filter (WF)
Figure 16:
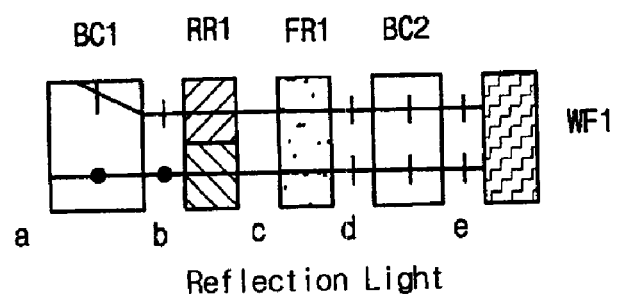
Figure 17:
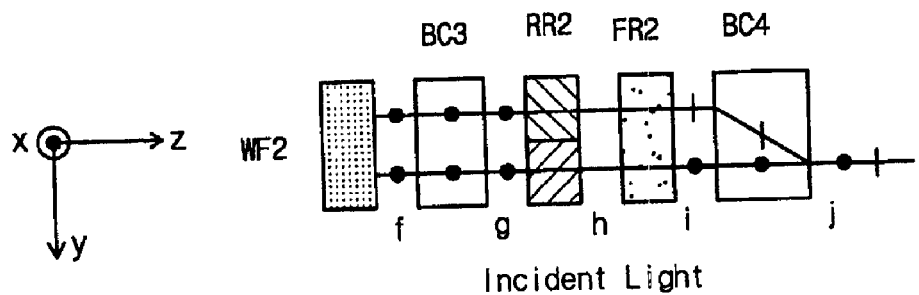
Figure 17:
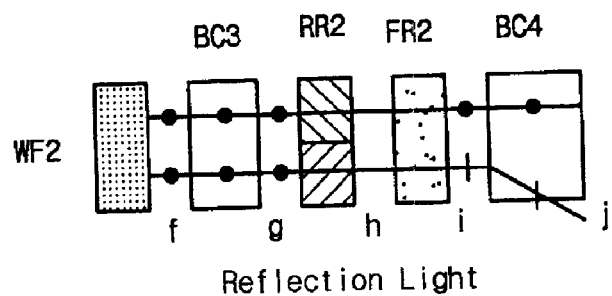

FIG. 16 and FIG. 17 show the propagation path and the polarization state of the optical waves inputted at ports (1) and (2), respectively and the propagation path and the polarization state of the optical waves reflected at the wavelength selective filter (WF).

The optical wave inputted at port (1) propagates according to the same transmission paths in FIG. 8 up to wavelength selective filter (WF). After reflected at the filter (WF1) it passes the second polarization splitter (BC2) with the identical polarization state as the incident light. But as it passes the non-reciprocal polarization rotator (FR1) and the reciprocal polarization rotator (RR1), the polarization state becomes different by 90° with the incident light and then is inputted into the first polarization splitter (BC1). And as shown in FIG. 16 the reflected light does not transmitted into the port (1) or (3).

The optical wave inputted at port (2) propagates according to the same transmission paths in FIG. 8 up to wavelength selective filter (WF). After reflected at the filter (WF1) it passes the second polarization splitter (BC3) with the identical polarization state as the incident light. But as it passes the reciprocal polarization rotator (RR2) and the non-reciprocal polarization rotator (FR1), the polarization state becomes different by 90° with the inputted optical wave and then is inputted into the fourth polarization splitter (BC4). And as shown in FIG. 17 the reflected light is does not transmitted into the port (2) or (4).

The length of the filters (WF1, WF2, WF3), in the direction of the x-axis, is determined by length of the polarization splitters (BC2, BC3) in the z-axis direction. The optical waves transmitted from port (1) to (2) pass the filter (WF1) in the +z direction. The waves transmitted from port (2) to (3) pass the filter (WF2) in the −z direction, and the waves from port (3) to (4) pass the filter (WF3) in the +z direction. Thus the length of the filter (WF1, WF2, WF3) in the direction of the x-axis should be adjusted so that it can follow the optical transmission path according to the length in the direction of the z-axis of the second and the third polarization splitter (BC2, BC3).

We can realize the wavelength selective filter (WF) in numerous manners and can change depending on the schemes (band split scheme and the wavelength-interleaved scheme) of the wavelengths allocation.

Figure 18:
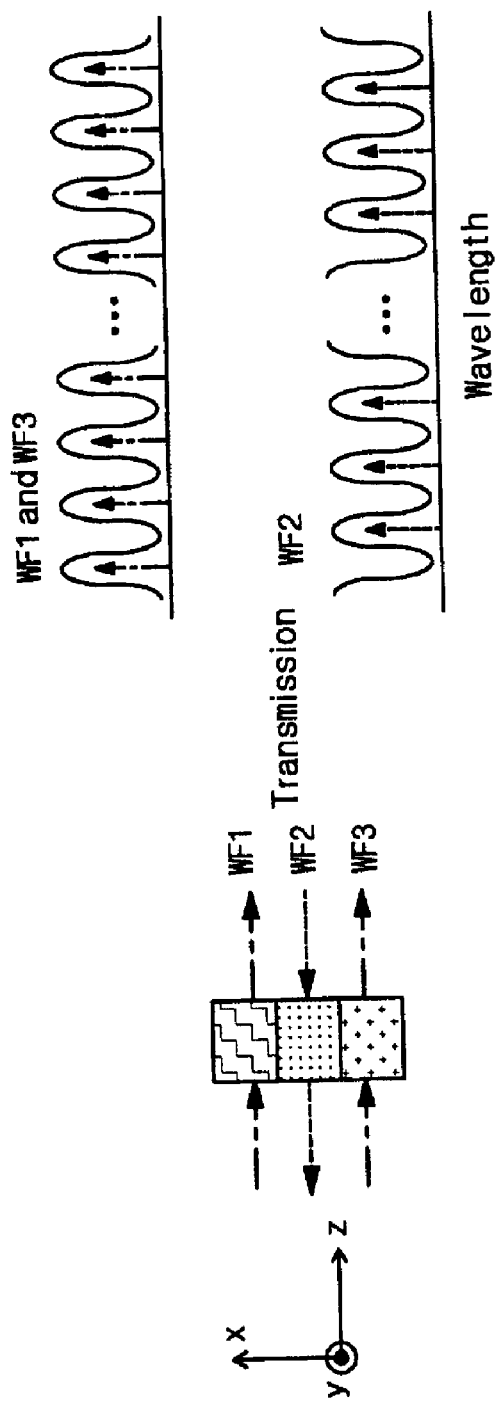
FIG. 18 shows the transmission characteristics of the wavelength selective filter (WF) of FIG. 7 according to an embodiment of the present invention.

FIG. 18 shows the transmission characteristics of the wavelength selective filter (WF) of the 4-port wavelength selective router (4pr). The wavelength selective filter (WF) is combination of three filters (WF1, WF2, WF3). Each of the filters (WF1, WF2, WF3) can be either a Fabry-Perot etalon filter or a comb filter consisting of birefringence crystals. The filter (WF1) and the filter (WF3) have the identical transmission characteristics and have periodic pass/stop-band. The filter (WF2) also has periodic pass/stop-band and its period is the identical to those of the above filter (WF1, WF3), but the passband is shifted by the half of the period from those of the above filters (WF1, WF3).

The signal transmission characteristics of a 4-port wavelength selective router (4pr) implemented by using the wavelength selective filter described in FIG. 18 is equivalent to the module #1 of Table 1. Here by changing the wavelength selective filter, we can implement other modules. For example, if filter (WF1) is not used so that all optical waves can be transmitted from port (1) to port (2), and the signal transmission characteristics would be identical to the module #4 of Table 1. Similarly if the filter (WF3) is not used, the signal transmission characteristics would be equivalent to the module #6 of Table 1.

Figure 19:
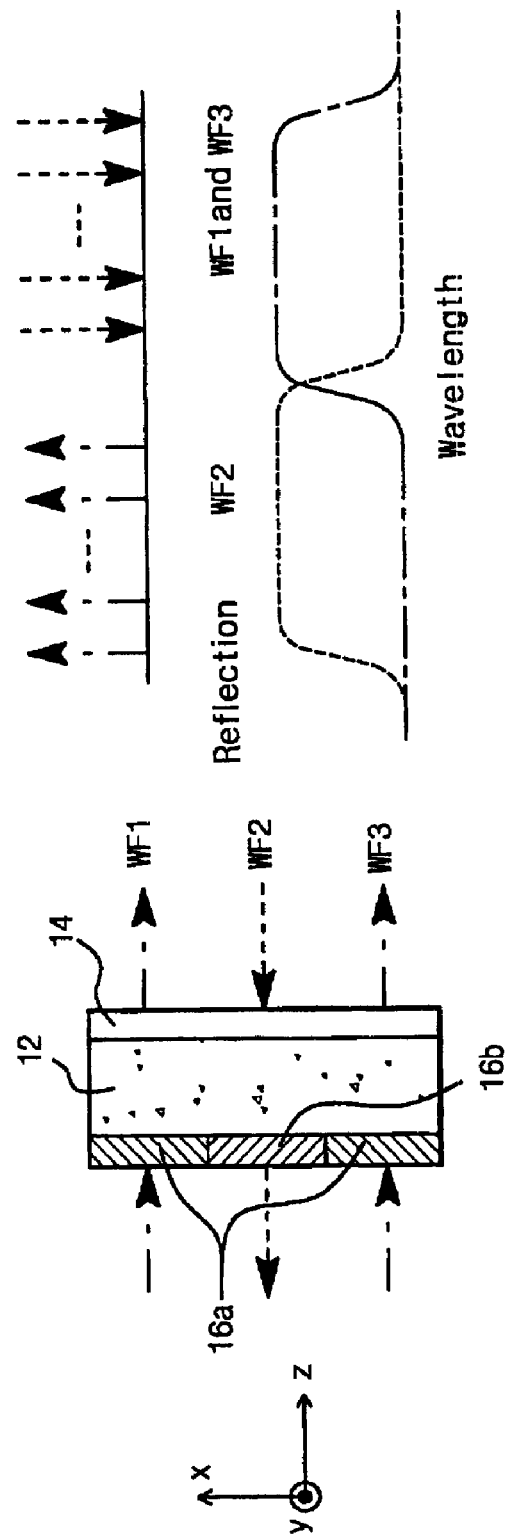
FIG. 19 shows the transmission characteristics of the wavelength selective filter (WF) of FIG. 7 according to another embodiment of the present invention.

The wavelength selective filter in FIG. 18 is suitable for the wavelength-interleaved bidirectional transmission systems and networks. We can implement 4-port wavelength selective router (4pr) to be used in band split bidirectional transmission systems and networks by changing the wavelength selective filter (WF) as shown in FIG. 19. The wavelength selective filter (WF) can be implement by using a thin film (12) and dielectric coating techniques. One side of the thin film (12) has an anti-reflection (AR) coating (14) while the other side has dielectric coatings (16a, 16b, 16a). The above dielectric coating (16a, 16b, 16a) reflects the signals with specific wavelengths. The filter (WF1) and the filter (WF3) have the identical reflection bands. The dielectric coatings (16b) should provides a reflection bands so that the reflection bands of the filter (WF2) should not overlap with those of the filter (WF1) and the filter (WF3).

Figure 20:
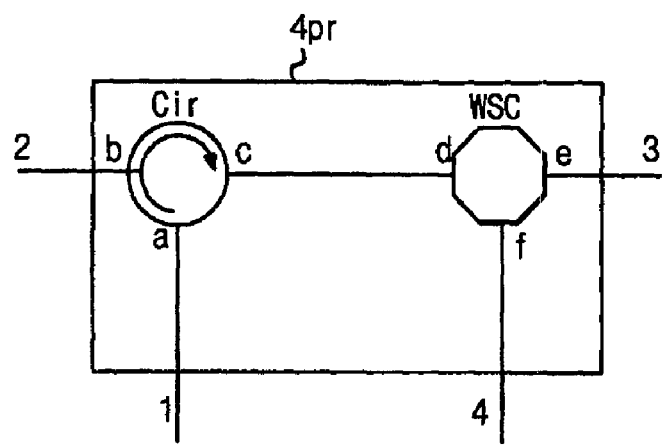
FIG. 20 shows a schematic diagram of the 4-port wavelength selective router according to another embodiment of the present invention.

The optical path router (4pr) according to the present invention can also be implemented by combining conventional devices. FIG. 20 illustrates an embodiment of the router comprising an optical circulator (Cir) and a wavelength selective coupler (WSC). The optical circulator (Cir) has an input port (a), an output port (c) and a common port (b), and the wavelength selective coupler (WSC) has two input/output ports (d, f) and a common port (e).

The connections are as follow: The input port (a) of the optical circulator (Cir) is connected to port (1) and the common port (b) is connected to port (2).

The output port (c) of the circulator (Cir) is connected to one of the input/output port (d) of the wavelength selective coupler (WSC), and the common input/output (e) of the wavelength selective coupler (WSC) is connected to port (3). The other input/output port (f) of the wavelength selective coupler (WSC) is connected to port (4). In this embodiment the signal transmission characteristics of the router (4pr) is equivalent to module #5 of Table 1.

Figure 21:
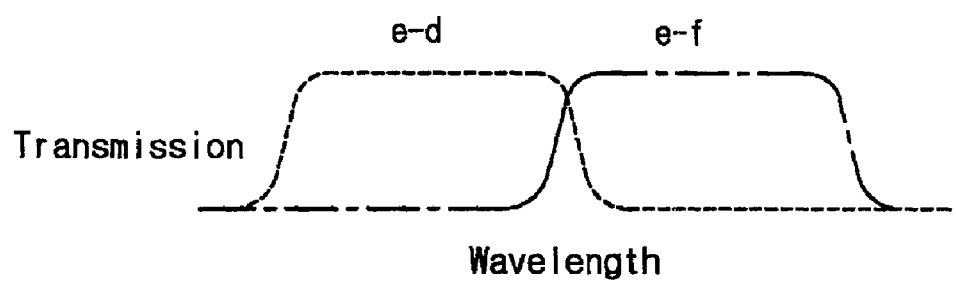
FIGS. 21 and 22 show the transmission characteristics of wavelength-selective coupler in the router in FIG. 20.

The wavelength selective coupler (WSC) can be divided in to two different types; a wavelength-division multiplexer and a wavelength-interleaver. FIG. 21 illustrates the signal transmission characteristics of the wavelength-division multiplexer. Between the common port (e) and the input/output port (d), signals within specific wavelength band can be transmitted bidirectionally, while between the common port (e) and the other input/output port (f), the signals within the other wavelength band excluding the previous one can be transmitted bidirectionally.

Figure 22:
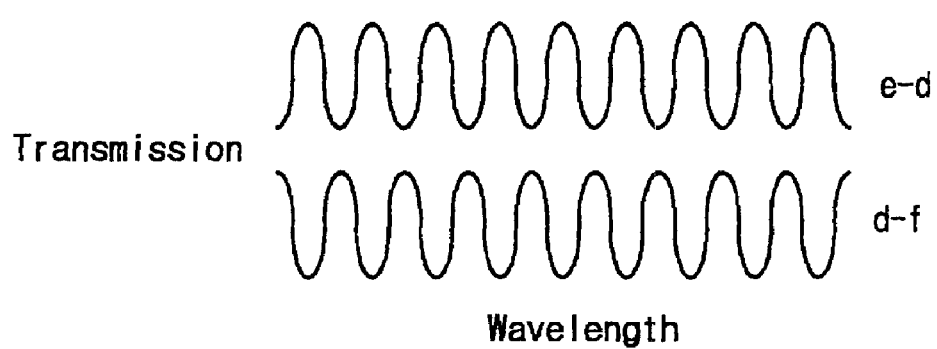

As shown in FIG. 22, the signal transmission characteristics of the wavelength-interleaver are as follows. The pass-band between the common port (e) and one of the input/output port (d) repeats with a specific period. Between the common port (e) and the other input/output port (f), the pass-band period is same but it is shifted by an half of the period from that of the common port (e) and the input/output port (d) pair.

Figure 23:
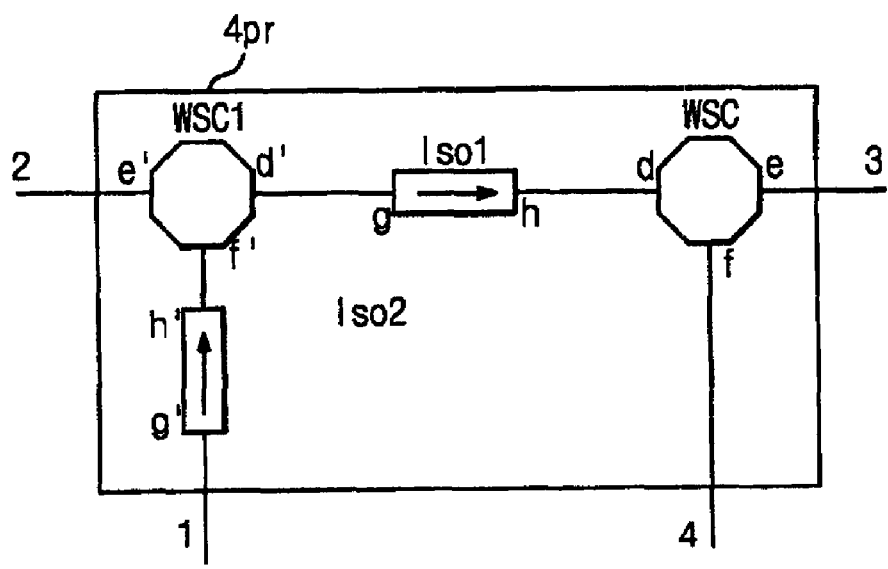
FIGS. 23, 24, 25, and 26 show schematic diagrams of the 4-port wavelength selective router according to other embodiments of the present invention.

The 4-port wavelength selective router (4pr) shown in FIG. 23 replaces the optical circulator (Cir) of FIG. 20 with a wavelength selective coupler (WSC1) and two optical isolators (Iso1, Iso2). The router (4pr) illustrated in FIG. 23 is composed of two wavelength selective couplers (WSC, WSC1) and two optical isolators (Iso1, Iso2). Each wavelength selective coupler (WSC, WSC1) has two input/output ports ((d, f), (d', f')) and a common port (e, e') and each optical isolator (Iso1, Iso2) has one input (g, g') and one output (h, h') ports.

The connections are as follow: The input port (g') of the optical isolator (Iso2) is connected to port (1), and the output port (h') of the isolator is connected to one of the input/output port (f') of the wavelength selective coupler (WSC1). The common port (e') of the wavelength selective coupler (WSC1) is connected to port (2) and the other input/output port (d') is connected to the other optical isolator's (Iso1) input port (g). This isolator's output port (h) is connected to one of the input/output ports (d) of the other wavelength selective coupler (WSC). The common port (e) of the wavelength selective coupler (WSC) is connected to port (3) and the other input/output port (f) of the wavelength selective coupler (WSC) is connected to port (4). In this embodiment the signal transmission characteristics of the router (4pr) is equivalent to module #3 of Table 1.

Figure 24:
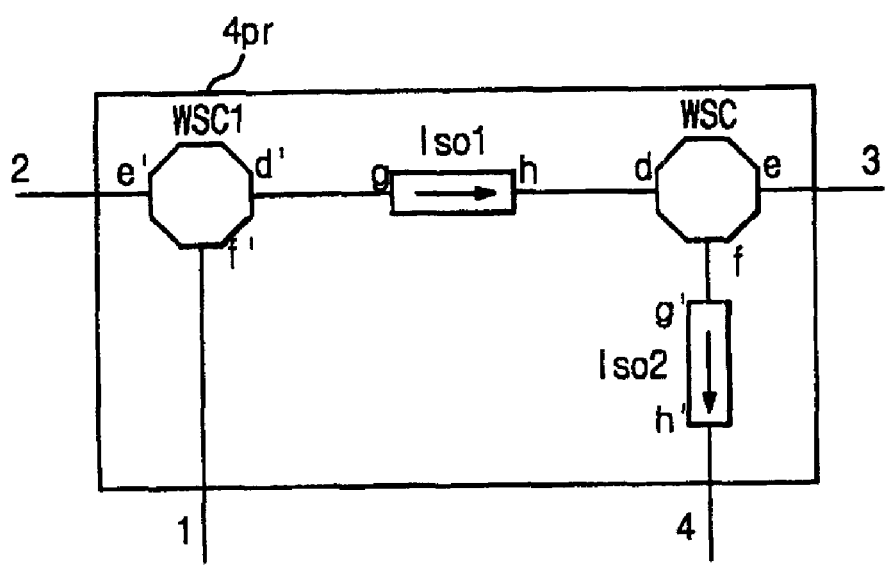

FIG. 24 shows a schematic diagram for the 4-port wavelength selective router (4pr) according to another embodiment of the present invention: The second optical isolator (Iso2) of FIG. 23 is inserted between one of the input/output ports (f) of the wavelength selective coupler (WSC) and port (4).

The optical path router (4pr) is composed of two wavelength selective coupler (WSC, WSC1) having two input/output ports ((d, f), (d', f')) and a common port (e, e'), and two optical isolator (Iso1, Iso2) having one input (g, g') and one output port (h, h'). One of the input/output port (f') of the (WSC1) is connected to port (1) and the common port (e') is connected to port (2). The other input/output port (d') of the wavelength selective coupler (WSC1) is connected to input port (g) of the optical isolator (Iso1) and output port (h) of the isolator (Iso1) is connected to one of input/output port (d) of the wavelength selective coupler (WSC). The common port (e) of the wavelength selective coupler (WSC) is connected to port (3) and the other input/output port (f) of the wavelength selective coupler (WSC) is connected to input port (g') of the isolator (Iso2). The output port (h') of the isolator (Iso2) is connected to port (4). In this embodiment the signal transmission characteristics of the router is equivalent to module #2 of Table 1.

Figure 25:
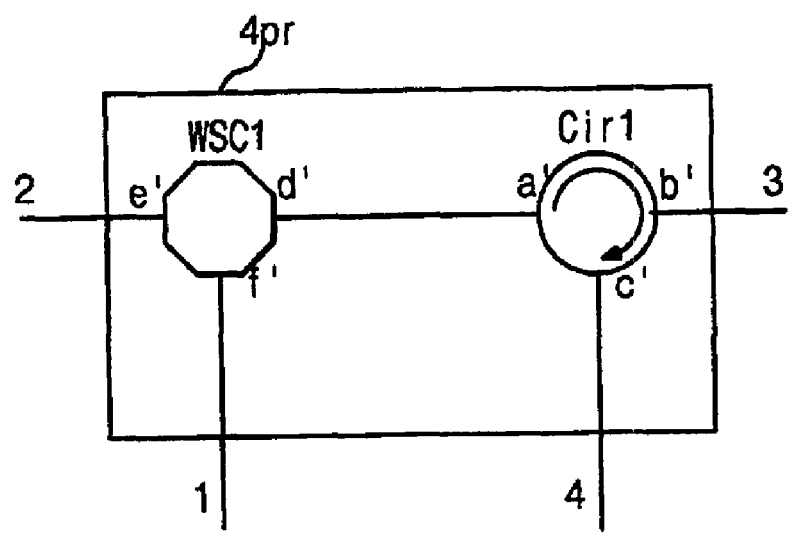

FIG. 25 shows a schematic diagram for the 4-port wavelength selective router (4pr) according to another embodiment of the present invention: Two optical isolators (Iso1, Iso2) and the wavelength selective coupler (WSC) of FIG. 24 are replaced by an optical circulator (Cir1).

The router (4pr) is composed of a wavelength selective coupler (WSC1) having two input/output ports (d', f') and a common port (e') and an optical circulator (Cir1) with an input (a'), an output (c'), and a common port (b'). One of the input/output ports (f') of the wavelength selective coupler (WSC1) is connected to port (1) and the common port (e') is connected to port (2). The other input/output port (d') of the wavelength selective coupler (WSC1) is connected to the input port (a') of the optical circulator (Cir1) and the common port (b') of the circulator (Cir1) is connected to port (3). The output port (c') of the optical circulator (Cir1) is connected to port (4). In this embodiment the signal transmission characteristics of the router is equivalent to module #7 of Table 1.

The wavelength selective coupler (WSC, WSC1) of FIG. 23, FIG. 24, and FIG. 25 is either a wavelength-division multiplexer or a wavelength-interleaver like the wavelength selective coupler (WSC) of FIG. 20.

Figure 26:
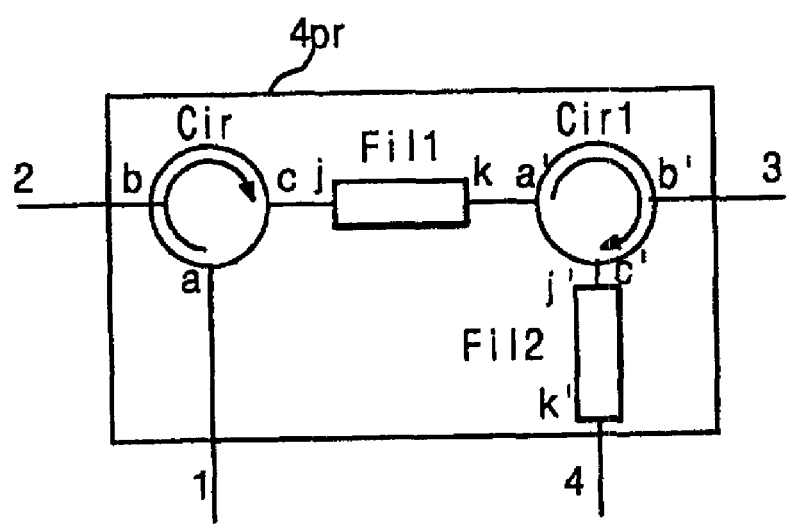

The wavelength selective router (4pr) shown in FIG. 26 replaces the wavelength selective coupler (WSC) of FIG. 20 with an optical circulator (Cir1) and two optical filters (Fil1, Fil2). The router (4pr) illustrated in FIG. 26 is composed of two optical circulators (Cir, Cir1) and two optical filters (Fil1, Fil2). Each optical circulator has an input port (a, a'), an output port (c, c') and a common port (b, b'), and each optical filter (Fil1, Fil2) has different pass/stop-bands with one input (j, j') and one output (k, k') ports.

The connections are as follow: The input port (a) of the optical circulator (Cir) is connected to port (1), and the input/output port (b) of the circulator (Cir) is connected to port (2). The output port (c) of the circulator (Cir) is connected to the input port (j) of the optical filter (Fil1) and the other port (k) of the filter (Fil1) is connected to the input port (a') of the other circulator (Cir1). This circulator's input/output port (b') is connected to port (3). The output port (c') of the circulator (Cir1) is connected to the input port (j') of the optical filter (Fil2) and the output port (k') of the filter (Fil2) is connected to port (4). In this embodiment the signal transmission characteristics of the router is equivalent to module #4 of Table 1.

The optical filter (Fil1, Fil2) is a band pass filter which passes optical signals within a specific wavelength band while cutting off optical signals outside the band, or a comb filter having the repeated pass/stop. And it has the same signal transmission characteristics shown in FIG. 21 or in FIG. 22. The pass and stop-bands of one optical filter (Fil1) are opposite to those of the other filter (Fil2).

Figure 27:
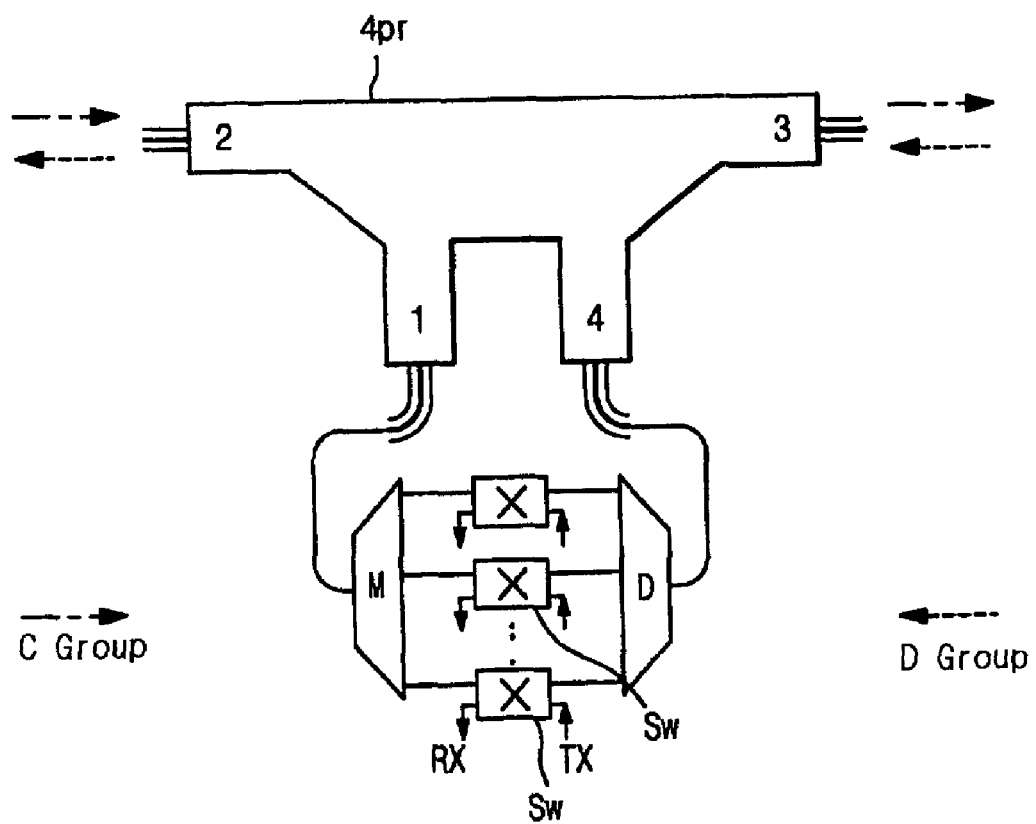
FIG. 27 shows a schematic diagram of the bidirectional add/drop multiplexer (ADM) using the router of the present invention.

FIG. 27 illustrates the construction of a bidirectional add/drop multiplexer (ADM) using the wavelength selective router (4pr) according to the present invention. By connecting the conventional add/drop module used in unidirectional optical transmissions to port (4) and (1) of the optical router (4pr), one can implement a bidirectional add/drop multiplexer (ADM) to add/drop signals propagating from right to left.

Figure 1:
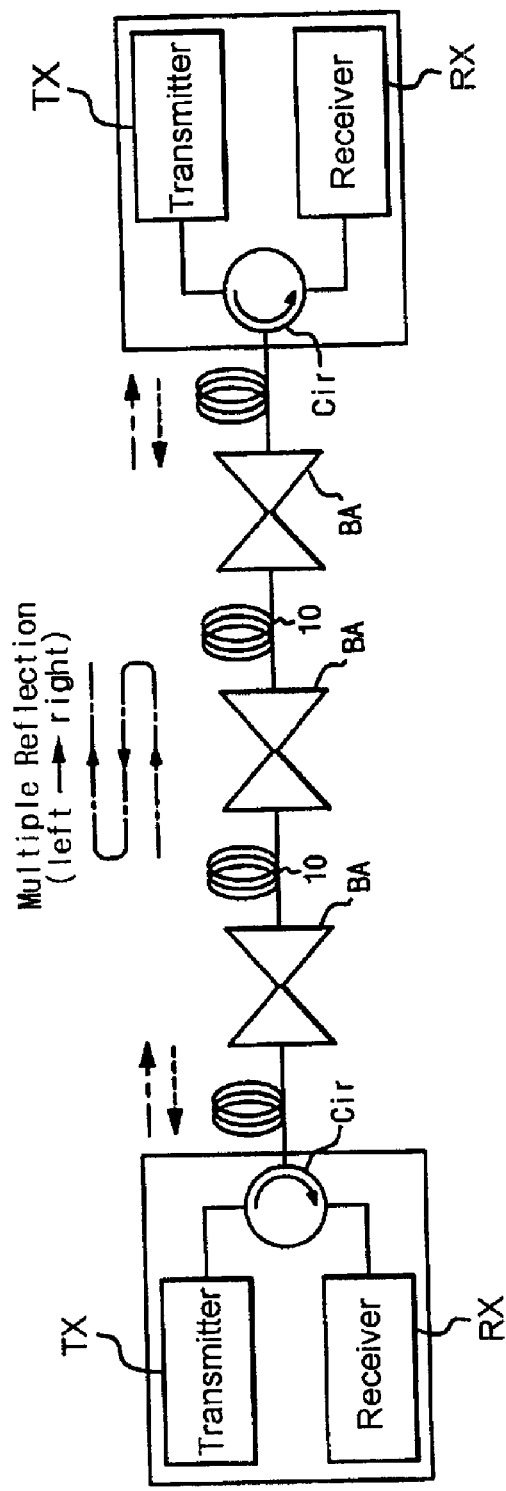
FIG. 1 shows a schematic diagram for the conventional WDM bidirectional transmission system.
Figure 2:
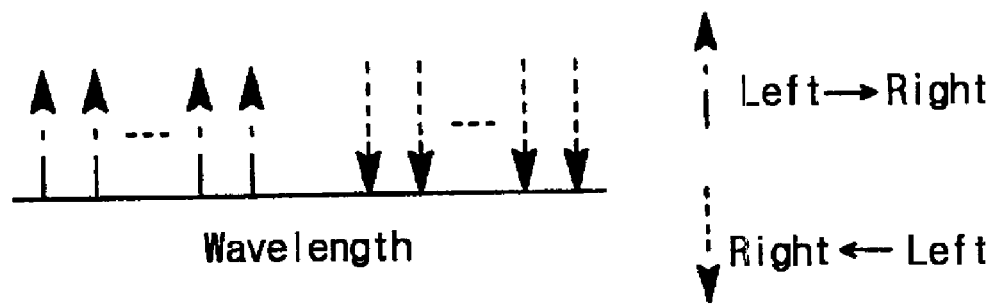
FIG. 2 and FIG. 3 show the wavelength allocation methods in WDM bidirectional transmission systems and networks.
Figure 3:
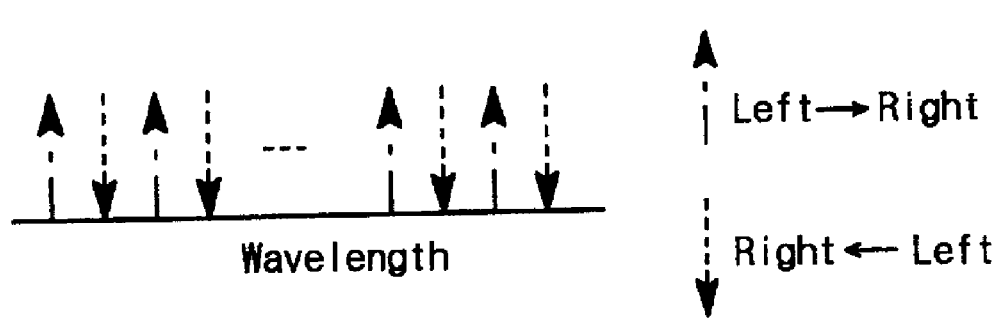
Figure 4:
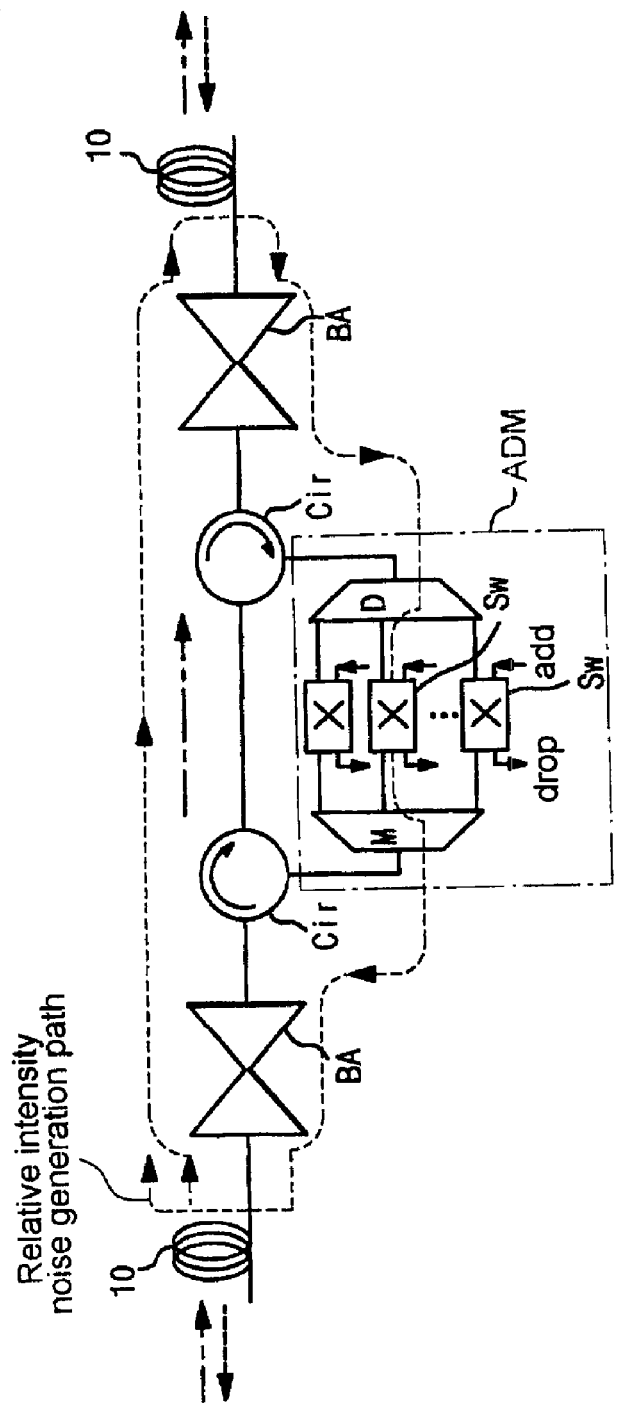
FIG. 4 shows a schematic diagram of bidirectional transmission system comprising a conventional add/drop multiplexer (ADM)

In other words, the input port of the de-multiplexer (D) is connected to port (4), the output port of the multiplexer (M) to port (1), and 2×2 optical switches (Sw) to the de-multiplexer's output ports and the multiplexer's input ports. Then one can drop or add the signals with specific wavelengths if the remaining two ports of the optical switch are connected to the receiver (RX) and the transmitter (TX), respectively. Unlikely the case of FIG. 4, the 4-port wavelength router still suppressed the multiple reflected lights.

The signals propagating from left to right can also be added/dropped in the same manners. In this case, we use a symmetrically modified router (4pr), in which the signal paths for the Group C propagating from left to right and for Group D propagating from right to left are interchanged.

If the two symmetric routers are connected together, both signals of Group C (traveling from left to right) and Group D (traveling from right to left) can be added/dropped at the same time.

As we have seen above, the wavelength selective router (4pr) according the present invention is useful in WDM bidirectional optical transmissions. It suppresses the multiple reflections, the limiting factor of the bidirectional transmission systems and networks, and effectively routes the counter-propagating signals. Therefore, the wavelength selective router (4pr) according the present invention simplifies the bidirectional signal transmissions with low cost.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. A 4-port wavelength selective router comprising four ports (1, 2, 3, 4) with internal signal transmission paths between three port pairs ((1,2), (2,3), (3,4)), and wherein;

when the first optical signal group, Group A, consisting of one or more signals with different wavelengths, and the second optical signal group, Group B, consisting of one or more signals with different wavelengths excluding signals in Group A, propagate bidirectionally, at port (2) Group A signals are inputted and Group B signals are outputted;

at port (3) Group B signals are inputted and Group A signals are outputted;

between port (2) and (3) only Group A signals are transmitted from port (2) to port (3), and no signals can be transmitted in the other direction;

between port (1) and (2), and port (3) and (4) the Group B signals or both Group A and B signals can be transmitted, but both Group A and B signals are not transmitted simultaneously through the two port pairs (in other words, between port (1) and (2), and port (3) and (4) at least one port pair transmits only the Group B signals);

between port (1) and (2), and port (3) and (4) optical waves can be transmitted bidirectionally, but at least one port pair transmits the signals in one direction, from port (1) to (2) or from port (3) to (4); and signals inputted to a specific port (1, 2, 3, 4) cannot be transmitted to more than one port (1, 2, 3, 4) simultaneously.

2. A 4-port wavelength selective router defined in claim 1, where in;

Group B signals are transmitted from Port (1) to Port (2);
Group A signals are transmitted from Port (2) to Port (3);
Group B signals are transmitted from Port (3) to Port (4); and
no signals are transmitted between other port pairs and in the other direction.

3. A 4-port wavelength selective router defined in claim 1, where in;

Group B signals are transmitted from Port (1) to Port (2);
Group B signals are transmitted from Port (2) to Port (1);
Group A signals are transmitted from Port (2) to Port (3);
Group B signals are transmitted from Port (3) to Port (4); and
no signals are transmitted between other port pairs and in the other direction.

4. A 4-port wavelength selective router defined in claim 1, where in;

Group B signals are transmitted from Port (1) to Port (2);
Group A signals are transmitted from Port (2) to Port (3);
Group B signals are transmitted from Port (3) to Port (4);
Group B signals are transmitted from Port (4) to Port (3); and
no signals are transmitted between other port pairs and in the other direction.

5. A 4-port wavelength selective router defined in claim 1, where in;

Group A and B signals are transmitted from Port (1) to Port (2);
Group A signals are transmitted from Port (2) to Port (3);
Group B signals are transmitted from Port (3) to Port (4); and
no signals are transmitted between other port pairs and in the other direction.

6. A 4-port wavelength selective router defined in claim 1, where in;

Group A and B signals are transmitted from Port (1) to Port (2);
Group A signals are transmitted from Port (2) to Port (3);
Group B signals are transmitted from Port (3) to Port (4);
Group B signals are transmitted from Port (4) to Port (3); and
no signals are transmitted between other port pairs and in the other direction.

7. A 4-port wavelength selective router defined in claim 1, where in;

Group B signals are transmitted from Port (1) to Port (2);
Group A signals are transmitted from Port (2) to Port (3);
Group A and B signals are transmitted from Port (3) to Port (4); and
no signals are transmitted between other port pairs and in the other direction.

8. A 4-port wavelength selective router defined in claim 1, where in;

Group B signals are transmitted from Port (1) to Port (2);
Group B signals are transmitted from Port (2) to Port (1);
Group A signals are transmitted from Port (2) to Port (3);
Group A and B signals are transmitted from Port (3) to Port (4); and
no signals are transmitted between other port pairs and in the other direction.

9. A 4-port wavelength selective router defined in claim 1, where in;

Group B signals are transmitted from Port (1) to Port (2);
Group A signals are transmitted from Port (2) to Port (3);
Group A and B signals are transmitted from Port (3) to Port (4);
Group A and B signals are transmitted from Port (4) to Port (3); and
no signals are transmitted between other port pairs and in the other direction.

10. A 4-port wavelength selective router defined in claim 1, where in;

with the connection between the port (1) and port (4), the optical signals propagating from port (2) to port (3) can not be transmitted from port (3) to port (2) and the optical waves propagating from port (3) to port (2) can not be transmitted from port (2) to port (3).

11. A bidirectional add/drop multiplexer, using a 4-port wavelength selective router defined in claim 1, comprising;

a de-multiplexer whose input port is connected to port (4) of the 4-port wavelength selective router defined in claim 1;
a multiplexer whose output port is connected port (1) of the 4-port wavelength selective router defined in claim 1;
one or more 2×2 optical switches (Sw) connected between the output ports of the de-multiplexer and the input ports of the multiplexer;
one or more receivers (RX) connected to one of the ports of the 2×2 switches (Sw); and
one or more transmitters (TX) connected to another of the ports of the 2×2 switches (Sw).

* * * * *